United States Patent
Attimont et al.

(10) Patent No.: US 6,366,072 B2
(45) Date of Patent: *Apr. 2, 2002

(54) OPTIMIZED POWER SUPPLY SYSTEM FOR AN ELECTRONIC CIRCUIT

(75) Inventors: Luc Attimont, Le Port Marly; Modeste Addra, Puteaux, both of (FR)

(73) Assignee: Alcatel, Paris (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/244,827

(22) Filed: Feb. 4, 1999

(30) Foreign Application Priority Data

Feb. 5, 1998 (FR) .............................. 98 01334

(51) Int. Cl.⁷ ................................ H02J 1/00; G04F 1/40
(52) U.S. Cl. ....................................... 323/349; 323/281
(58) Field of Search ..................... 323/349, 222, 323/284, 234; 327/513, 538

(56) References Cited

U.S. PATENT DOCUMENTS

| | | | |
|---|---|---|---|
| 4,340,973 A | * | 7/1982 | Umetsu ...................... 455/228 |
| 4,348,727 A | * | 9/1982 | Kobayashi et al. ......... 701/104 |
| 4,384,361 A | | 5/1983 | Masaki |
| 4,495,648 A | * | 1/1985 | Giger ............................ 455/73 |
| 4,580,262 A | * | 4/1986 | Naylor et al. ................ 714/708 |
| 4,652,875 A | | 3/1987 | Waki |
| 4,691,382 A | | 9/1987 | Nakajima |
| 5,191,278 A | | 3/1993 | Carpenter |
| 5,218,705 A | | 6/1993 | DeLuca et al. |
| 5,285,650 A | * | 2/1994 | Lin .............................. 62/133 |
| 5,285,850 A | * | 2/1994 | Lin .............................. 62/133 |
| 5,307,003 A | * | 4/1994 | Fairbanks et al. ........... 323/222 |
| 5,384,564 A | | 1/1995 | Wycoff et al. |
| 5,606,739 A | * | 2/1997 | Goto ........................... 455/343 |
| 5,625,278 A | | 4/1997 | Thiel et al. |
| 5,629,609 A | | 5/1997 | Nguyen et al. |
| 5,686,821 A | | 11/1997 | Brokaw |
| 5,760,636 A | * | 6/1998 | Noble et al. ................. 327/513 |
| 5,796,982 A | * | 8/1998 | Iwami et al. ................ 395/500 |
| 5,864,225 A | * | 1/1999 | Bryson ........................ 323/268 |
| 5,977,733 A | * | 11/1999 | Chen ........................... 318/434 |
| 6,157,092 A | * | 12/2000 | Hofmann ...................... 307/11 |

FOREIGN PATENT DOCUMENTS

| | | |
|---|---|---|
| EP | --32 598 | 11/1980 |
| EP | 0376 665 | 12/1989 |
| EP | 0740 481 A2 | 4/1996 |

* cited by examiner

Primary Examiner—Rajnikant B. Patel
(74) Attorney, Agent, or Firm—Sughrue Mion, PLLC

(57) ABSTRACT

Electronic evaluation device provided within an electronic circuit so as to deliver an indication of the operating conditions of the electronic circuit, which indication is used to adjust the power supply voltage to a minimum value at which the electronic circuit can still operate correctly.

5 Claims, 2 Drawing Sheets

FIG_1
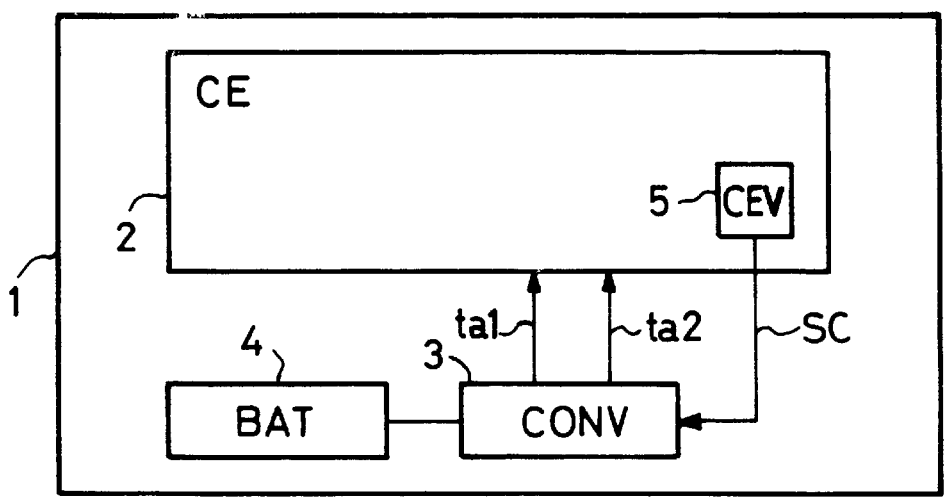
FIG_2
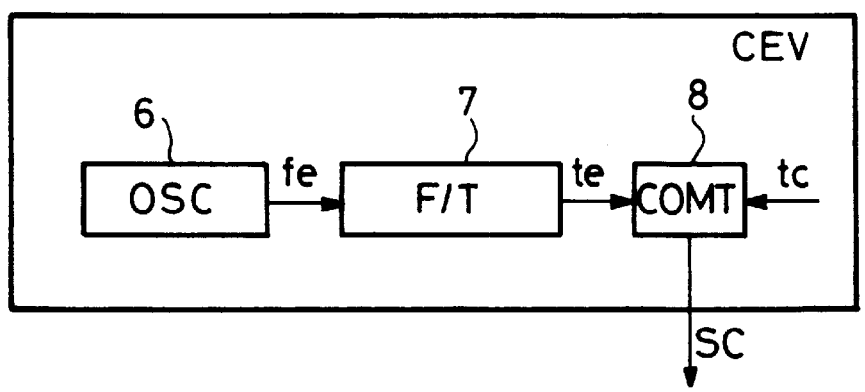
FIG_3
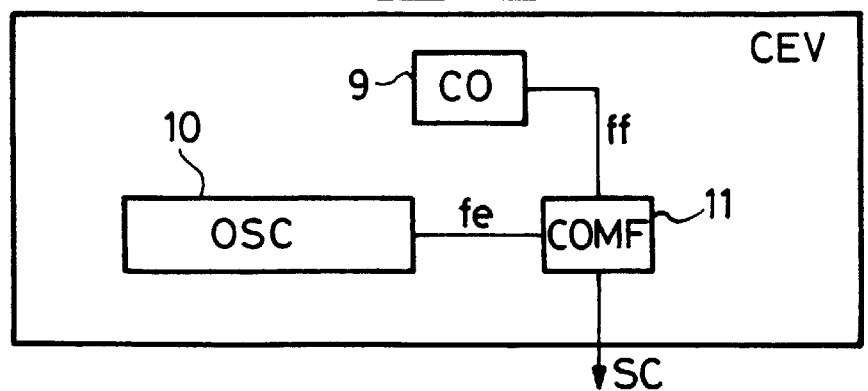

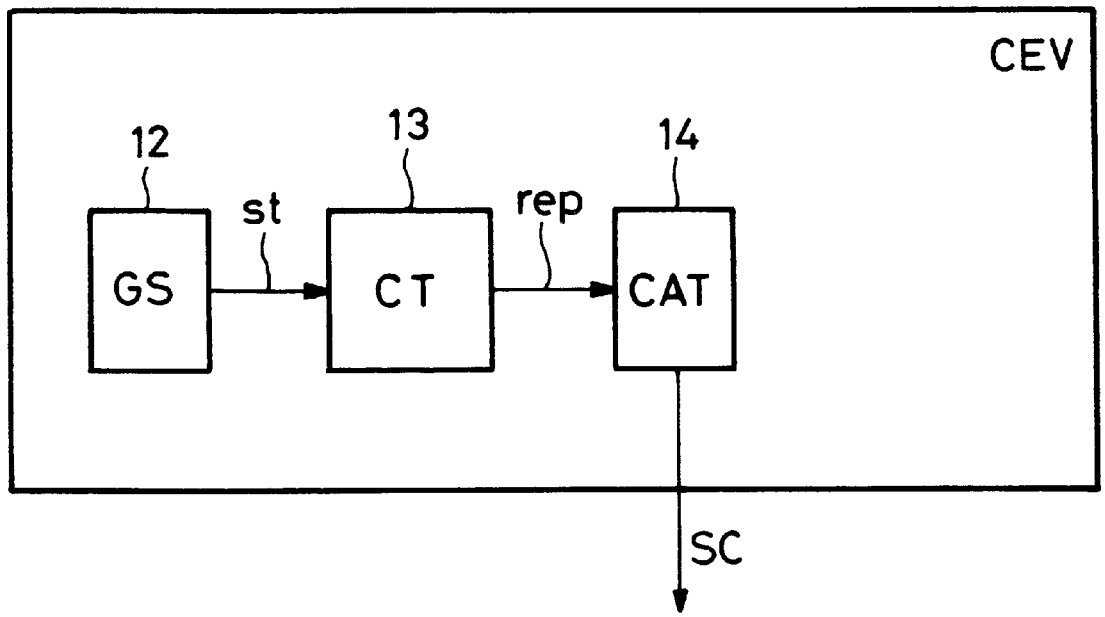
FIG_4
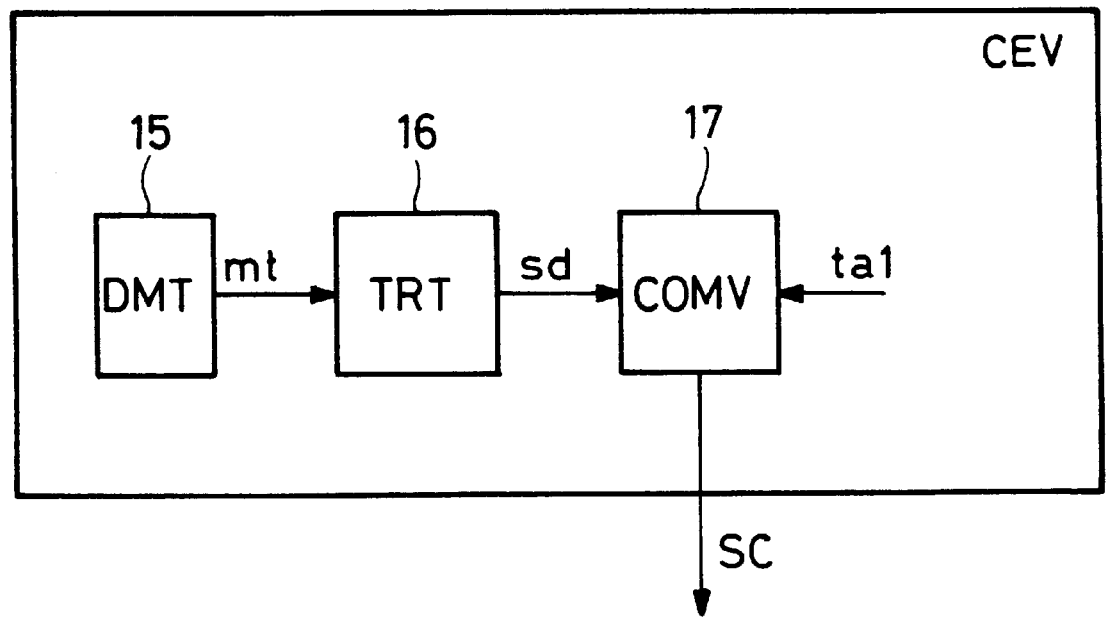
FIG_5

OPTIMIZED POWER SUPPLY SYSTEM FOR AN ELECTRONIC CIRCUIT

The present invention relates to an optimized power supply system for an electronic circuit.

BACKGROUND OF THE INVENTION

A system of this type is already known, e.g. from Patent Document U.S. Pat. No. 5,218,705. The electronic circuit in question is contained in receiver apparatus for receiving personal messages and commonly referred to as a "pager". The power supply voltage for the electronic circuits of the pager is delivered via a variable-voltage DC-to-DC voltage converter from a rechargeable battery or from a non-rechargeable battery. To save energy, and therefore to increase the operating time of the pager between battery recharging or battery replacement, or to reduce battery costs, the power supply voltage is adjusted to an operating value. The operating value is determined on initializing operation of the pager, by taking into account the data rate at which the pager is to receive data, and it cannot be less than a minimum operating voltage. The minimum operating voltage is also determined on initializing operation of the pager, by means of tests during which the voltage is gradually reduced for as long as the electronic circuits operate correctly, then the lowest voltage defined in this way is memorized, and operation of the voltage converter is adjusted accordingly.

The power supply voltage is thus determined on the basis of tests which take place when the terminal is switched on. The setting is then not modified again until the apparatus is switched off.

Naturally, the same provisions can be applied to any portable apparatus that contains an electronic circuit and a power supply therefor based on a rechargeable battery or on a non-rechargeable battery, in order to increase the operating time between battery recharging or battery replacement, or in order to use a source that is of smaller capacity, and therefore of lower cost. However, in general, such provisions can be applied particularly advantageously to portable communications apparatus.

The invention is based on the observation that that type of apparatus is often switched on by its user when in a vehicle or when at home and on the point of leaving home. It then remains in operation while the user is away from home, which is when it is of use to enable the user to be reached, or to enable the user to communicate, while being distant from any fixed installation. Unfortunately, the conditions surrounding the apparatus can change considerably from the time at which it is switched on to the time at which it is actually used.

For example, in winter, from being initially in a room heated to 20° C., the apparatus can then find itself in the open air at −10° C. The cooling of the electronic circuits can slow down their operating rate, depending on the technology used, in the same way as it is slowed down by a reduction in its power supply voltage. Thus, under such conditions, if the power supply voltage of the pager really were at its minimum value, such a drop in the temperature of the apparatus could make it incapable of receiving a message correctly. Using the known system thus requires margins to be provided in order to cope with changing environmental conditions. Consequently, the power supply voltage setting is not genuinely optimum.

It is also possible to consider the opposite case, i.e. in summer, with the apparatus initially in a cool room, and then taken out into the sun and into contact with the user, its temperature then possibly going from 20° C. to 40° C. In which case, the power supply voltage is not set optimally either.

OBJECTS AND SUMMARY OF THE INVENTION

An object of the present invention is thus to provide a better solution, tending better than the prior art solution towards optimum adjustment of the power supply voltage, so as to save energy, in order to increase the operating time of the apparatus between battery recharging or battery replacement, or in order to reduce battery costs.

According to the invention, electronic evaluation means are provided within the electronic circuit so as to deliver an indication of the operating conditions of the electronic circuit, which indication is used to adjust the power supply voltage to a minimum value at which said electronic circuit can still operate correctly.

In an embodiment of the invention, said electronic evaluation means comprise an oscillator whose operating frequency delivers said indication. This frequency is then converted into a signal of corresponding voltage which is compared with a reference value which is also a voltage, the result of said comparison being used to adjust the power supply voltage to a minimum value at which said electronic circuit can still operate correctly.

In another embodiment, said evaluation means comprise a test circuit comprising at least one circuit that is sensitive to the value of the power supply voltage and to the environmental conditions, the circuit periodically receiving one or more stimuli and delivering at least one test signal used to adjust the power supply voltage to a minimum value at which said electronic circuit can still operate correctly.

In yet another embodiment, said evaluation means comprise a device delivering an evaluation signal representing the temperature to which said electronic circuit is subjected, and a conversion device converting said evaluation signal into a control signal that is used to adjust the power supply voltage to a minimum value at which said electronic circuit can still operate correctly.

BRIEF DESCRIPTION OF THE DRAWINGS

The various objects and characteristics of the invention appear more clearly from the following description of embodiments of the invention, given with reference to the accompanying drawings, in which:

FIG. 1 is a general diagram of apparatus incorporating the present invention;

FIG. 2 shows a first embodiment of the evaluation means of the apparatus shown in FIG. 1;

FIG. 3 shows a second embodiment of the evaluation means of the apparatus shown in FIG. 1;

FIG. 4 shows a third embodiment of the evaluation means of the apparatus shown in FIG. 1; and FIG. 5 shows is a fourth embodiment of the evaluation means of the apparatus shown in FIG. 1.

MORE DETAILED DESCRIPTION

The general diagram in FIG. 1 shows portable apparatus 1 which may, for example, be a radiotelephone essentially comprising an electronic circuit 2, referred to as "CE", which is powered via a DC-to-DC power supply voltage converter 3, referred to as "CONV", from an energy source 4 which is conventionally a rechargeable battery "BAT". The converter CONV delivers at least one DC power supply voltage ta1, and it can deliver at least one second power supply voltage ta2.

The man-machine interface elements, such as the screen, the keypad, etc, that are nearly always to be found on such portable electronic apparatus, together with the electronic circuit CE, and that can be powered without any specific problems being encountered, are not described herein, nor are they shown in the figures.

With commonly-used technology, the electronic circuit CE may be implemented in the form of an integrated circuit comprising one or more chips made of semiconductor material. The invention is applicable regardless of how the electronic circuit is implemented.

In accordance with the invention, electronic evaluation means 5, referred to as "CEV", are also provided within the electronic circuit CE, these means being organized to deliver an indication sc of the operating conditions of the electronic circuit CE, which indication is used to adjust the power supply voltage ta1 to a minimum value at which said electronic circuit CE can continue to operate correctly.

The indication sc is an electrical signal, e.g. a voltage, which may take two (or more) values, each value determining a change to be made to the power supply voltage ta1 (and ta2). For example, if the signal sc is of positive voltage (above a given threshold), then voltage ta1 must be increased by one determined quantity unit. If the signal sc is of negative voltage (below some other given threshold), then the voltage ta1 must be decreased by the same quantity unit. Between the two above-mentioned threshold values, the signal sc has no influence.

The signal sc thus makes it possible to adjust the power supply voltage. The conditions under which it is delivered make it possible to adjust the power supply voltage, as indicated above, to a minimum value at which said electronic circuit CE can still operate correctly. For this purpose, it is necessary to consider how the electronic evaluation means CEV may be embodied.

The evaluation means CEV are said to be "electronic" because they must be sensitive to the same environmental conditions as the circuit CE, and to be so in substantially the same manner, and they must also be sensitive to the power supply voltage, but merely in a manner making it possible to adjust the voltage to a minimum value, e.g. in a servo-control loop.

Several embodiments are described below with reference to FIGS. 2 to 5, in which like elements are given like references, so as to show up likenesses and differences between the embodiments.

FIG. 2 is a diagram showing a first embodiment of the evaluation means CEV of the apparatus shown in FIG. 1. The first embodiment comprises an oscillator 6, referred to as "OSC", for delivering a signal of frequency fe to a frequency-to-voltage converter 7, referred to as "F/T", which delivers an evaluation voltage signal te to a voltage comparator 8, referred to as "COMT", which also receives a reference voltage tc. The comparator COMT delivers the signal sc for adjusting the power supply voltage as indicated in the description with reference to FIG. 1.

All the circuits in the evaluation means CEV must preferably be implemented using the same technology as the electronic circuit CE so that they respond in the same way both to environmental conditions and also to the various values of the power supply voltage. When the circuit CE is essentially an integrated circuit, the means CEV are advantageously incorporated in the same chip.

The oscillator OSC may merely be a loop comprising an odd number of identical gates. Its natural frequency of oscillation depends on the propagation delay time through a gate, and is a representation of the operating conditions of the entire circuit CE.

The frequency-to-voltage converter F/T may be essentially a linear integrator integrating pulses of constant area in an amplitude-duration diagram at the frequency of the signal fe, and thus delivering a signal te of voltage that is proportional to the frequency of the pulses.

The comparator COMT receives the signal te as well as a predefined voltage tc, so as to deliver a signal sc equal to the difference (tc−te). It can be seen that if the frequency is low, te can be less than tc, and the difference (tc−te) can be positive, which, as indicated above, can cause an increase in the power supply voltage, thereby increasing the frequency. Conversely, if the frequency is high, te can be greater than tc, (tc−te) can be negative, and the signal sc then causes a decrease in the power supply voltage of the circuit CE, thereby decreasing the frequency. The power supply voltage is thus servo-controlled so that the operating frequency of the circuit CE is maintained at a value that is defined by the reference tc, which value is the minimum value at which the electronic circuit CE can still operate correctly.

FIG. 3 shows a variant of the evaluation means CEV shown in FIG. 2. In this variant, with an oscillator 9, referred to as CO, delivering a stable frequency ff, and already available in the electronic circuit CE, the frequency fe of an oscillator OSC 10 is compared with the stable frequency ff in a frequency comparator COMF 11, which delivers the signal sc directly.

FIG. 4 shows another embodiment of the evaluation means CEV shown in FIG. 1. This embodiment includes a stimuli generator 12, referred to as "GS", which cyclically delivers combinations of signals st which are applied to a set of circuits under test 13, referred to as "CT", which respond by delivering response signals rep transmitted to a response evaluation circuit 14, referred to as "CAT", which, in exchange, delivers the signal sc. The stimuli generator GS may be a memory that is read periodically, during intervals in which the circuit CE is at rest. The combinations of signals are applied to circuits under test which are constituted either by a subset of the circuit CE, or by a dedicated test circuit, comprising switching circuits, memories, etc., constituting a representation of the circuit CE, and whose response rep, i.e. the signals obtained in exchange for the stimuli st, is evaluated, i.e., for example, compared with an expected response, so as to produce a signal sc that is an evaluation of the operation of the circuit CE as indicated above with reference to FIGS. 1 to 3.

Finally, FIG. 5 shows an embodiment of the evaluation means CEV shown in FIG. 1. This embodiment includes a device 15 for measuring or sensing temperature, referred to as "DMT", which device delivers a temperature indication mt to a temperature response table 16, referred to as "TRT", which delivers a signal sd.

Temperature sensors are known to the person skilled in the art. The temperature measurement mt is a digital value. The values in the table TRT are obtained from a test cycle so that, for each temperature sd of the circuit CE, the table indicates the power supply voltage which should be delivered to the circuit CE. The signal sd delivers this indication. To be consistent with the above, FIG. 5 also shows a power supply voltage comparator 17, referred to as "COMV", which also receives the voltage ta1, and which delivers the control signal sc, under the conditions described above. But naturally, the signal sd could be transmitted directly to a power supply converter such as "CONV" (FIG. 1) and that is organized to respond directly to a signal sd indicating a power supply voltage level by delivering a power supply voltage ta1, ta2, having this level.

What is claimed is:

1. An optimized power supply system for an electronic circuit whose power supply voltage is delivered via a variable-voltage DC-to-DC voltage converter from a battery, wherein an electronic evaluation means is provided within the electronic circuit comprising a voltage comparator that compares an evaluation voltage representative of an environmental operating condition of the electronic circuit with a reference voltage so as to deliver an indication of the environmental operating condition of the electronic circuit, wherein said indication is used to adjust the power supply voltage to a minimum value at which said electronic circuit can still operate correctly in the detected environmental operating condition.

2. A power supply system according to claim 1, wherein said electronic evaluation means comprise an oscillator whose operating frequency delivers a signal that is representative of said environmental operating condition of said electronic circuit.

3. A power supply system according to claim 2, wherein said frequency is then converted into a signal of corresponding voltage which is compared via said comparator with a reference value which is also a voltage, the result of said comparison being used to adjust the power supply voltage to a minimum value at which said electronic circuit can still operate correctly.

4. An optimized power supply system for an electronic circuit whose power supply voltage is delivered via a variable-voltage DC-to-DC voltage converter from a battery, wherein an electronic evaluation means is provided within the electronic circuit so as to deliver an indication of the environmental operating conditions of the electronic circuit, which indication is used to adjust the power supply voltage to a minimum value at which said electronic circuit can still operate correctly in said environmental operating conditions, said evaluation means comprises a signal generator that cyclically delivers one or more signals representative of an environmental operating condition to a test circuit with at least one circuit that is sensitive to the value of the power supply voltage and to the environmental operating condition, and delivers at least one response used to adjust the power supply voltage to a minimum value at which said electronic circuit can still operate correctly in said environmental operating condition.

5. A power supply system according to claim 1, wherein said evaluation means comprises a device delivering an evaluation signal representing a temperature to which said electronic circuit is subjected, and a conversion device converting said evaluation signal into a control signal that is used to adjust the power supply voltage to a minimum value at which said electronic circuit can still operate correctly, wherein said conversion device comprises a temperature response table that indicates a voltage value that corresponds to said temperature.

* * * * *